United States Patent Office 3,445,490
Patented May 20, 1969

3,445,490
6-HALO-Δ⁴-PREGNENE-16α,17α-DIOL-3,20-DIONES
Howard J. Ringold and George Rosenkranz, Mexico City, Mexico, assignors, by mesne assignments, to Syntex Corporation, a corporation of Panama
No Drawing. Continuation-in-part of applications Ser. No. 807,774, Apr. 21, 1959, and Ser. No. 56, Jan. 4, 1960. This application June 8, 1960, Ser. No. 34,633
Claims priority, application Mexico, Apr. 24, 1958, 50,807
Int. Cl. C07c *169/52, 169/50;* A61k *27/00*
U.S. Cl. 260—397.4                9 Claims The present invention relates to novel cyclopentanophenanthrene derivatives.

In particular the invention relates to

Δ⁴-pregnene-16α,17α-diol-3,20-diones halogenated at C–6 with a chlorine or fluorine atom and which may also have an additional double bond between C–1 and C–2 and/or a hydroxy group at C–21, as well as to esters thereof.

The present application is a continuation-in-part of our copending applications Ser. No. 807,774, filed on April 21, 1959 and of Ser. No. 56 filed on Jan. 4, 1960 both now abandoned.

The novel compounds of the present invention which are progrestational agents of anti-estrogenic effect are illustrated by the following formulas:

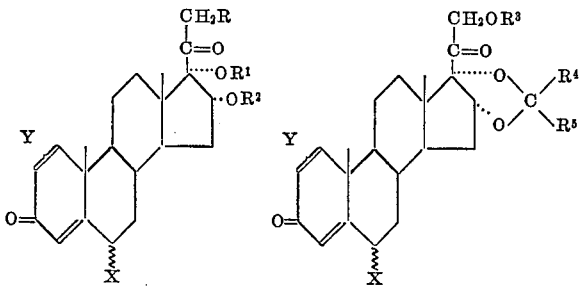

In the above formulas, X represents chlorine or fluorine; Y represents a double bond between C–1 and C–2 or a saturated linkage between C1 and C2; R represents hydrogen, hydroxy or an acyloxy group of a hydrocarbon carboxylic acid of up to 12 carbon atoms; R', R² and R³ each represent hydrogen or an acyl group of a hydrocarbon carboxylic acid of up to 12 carbon atoms; and R⁴ and R⁵ represent hydrogen or lower alkyl.

The novel compounds of this invention are also valuable intermediates for the preparation of 6α-fluoro-16α-hydroxy cortical hormones since an oxygen function can be introduced at C–11 by known biochemical methods to form compounds having anti-inflammatory activity. For example, the incubation of 6α-fluoro-Δ⁴-pregnene-16α,17α,21-triol-3,20-dione and of 6α - fluoro-Δ¹,⁴-pregnadiene-16α,17α,21-triol-3,20-dione with suprarenal glands of bovine or with species of *Cunninghamella bainieri* ATCC 9244 effects introduction of the hydroxyl group in the β-position at C–11 whereas incubation with *Rhizopus nigricans* ATCC 6227b produces hydroxylation in the α-position. Similarly, the 16,17-acetonide of 6α-fluoro-Δ⁴-pregnene-16α,17α,21-triol-3,20-dione or the 1-dehydro derivative therof can be incubated to introduce 11-β or 11α-hydroxy groups. Thus, 6α-fluoro-16α-hydroxy-hydrocortisone, 6α-fluoro-16α-hydroxy-prednisolone and their 16,17-acetonides as well as the 11-epi compounds are produced from the novel compounds of this invention.

The 11-hydroxyl group of the aforementioned compounds can be oxidized to the keto group, for example by reaction with chromic acid in dilute acetic acid with previous protection of the other hydroxyl groups which may be attacked during the oxidation. The 16,21-diesters of 6α-fluoro-16α-hydroxy-hydrocortisone and of 6α-fluoro-16α-hydroxy-prednisolone are converted into the respective diesters of 6α-fluoro-16α-hydroxy cortisone and of 6α-fluoro-16α-hydroxy-prednisone. For the oxidation of the 11α-hydroxyl group one starts from a 21-ester of the 16,17-acetonide of 6α-fluoro-16α-hydroxy-hydrocortisone or from a 21-ester of the 16,17-acetonide of 6α-fluoro-16α-hydroxy-prednisolone.

Furthermore, the 6α-fluoro-11-hydroxy-derivatives of Δ⁴-pregnene-16α,17α,21-triol-3,20-dione and of its 1-dehydro analog can be dehydrated at C–9,11, with previous protection of the other primary and secondary hydroxyl groups, for example, they are heated with methanesulfonyl chloride in mixture with dimethylformamide and pyridine, to produce the 16,21-diesters of 6α-fluoro-Δ⁴,⁹⁽¹¹⁾-pregnadiene-16α,17α,21-triol-3, 20-dione and of its 1-dehydro analog, as well as the 21-esters of the 16,17-acetonides of the latter, respectively. Such compounds are valuable intermediates for the preparation of 6α-fluoro-9α-halo-16α-hydroxy cortical hormones, since there can be applied the method of Fried et al. (J. Am. Chem. Soc. 79, 1130 (1957)).

The novel compounds of the present invention where R is hydrogen or acyloxy and R' and R² are acyl are particularly useful progestational agents.

The new compounds may be prepared in the following manner. The preparation of the novel compounds wherein R' and R² represent acyl groups and R and X represent the same groups as heretofore stated, may be illustrated by the following equation:

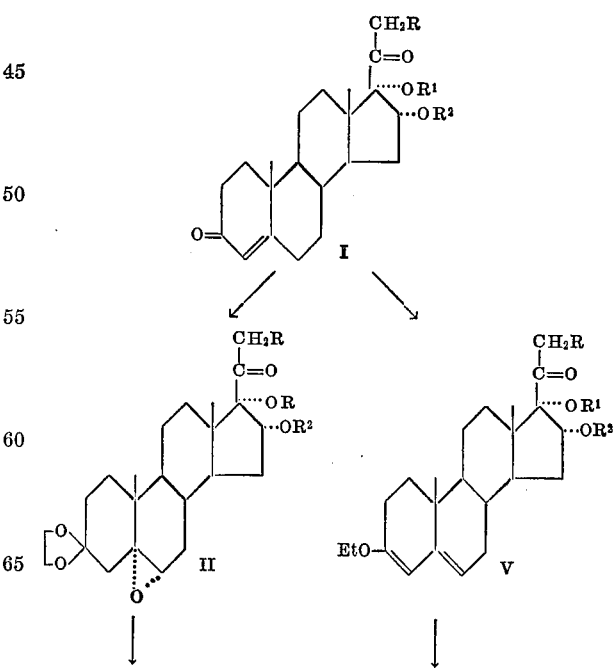

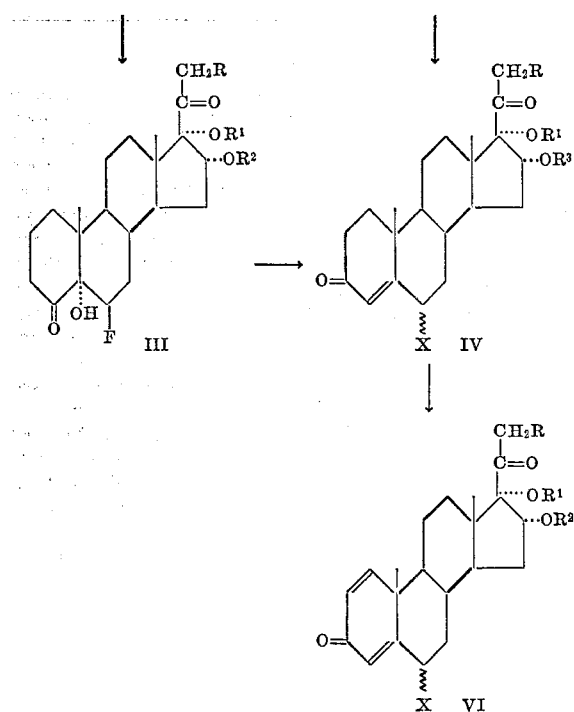

The hydroxyl groups of Δ⁴-pregnen-16α,17α-diol-3,20-dione or its 21-acetoxy analogue, described by Petrow et al. (J. Chem. Soc. 4383 (1955)) were esterified to obtain our starting material (I).

For introducing a fluorine atom at C-6 we first ketalized the keto group at C-3, preferably we prepared the 3-cycloethyleneketal by refluxing with ethyleneglycol in mixture with benzene in the presence of p-toluenesulfonic acid and under anhydrous conditions; we then epoxidized the double bond which had migrated between C-5 and C-6 and thus we produced the corresponding diester of 3 - ethylenedioxy - 5α,6α - oxido - pregnan - 16α,17α-diol-20-one (II; R=H) or the corresponding triester of 3 - ethylenedioxy - 5α,6α - oxido - pregnan - 16α,17α,21-triol-20-one (II; R=acyloxy). By subsequent reaction with boron trifluoride etherate, preferably in mixture with benzene and ether, at room temperature, we opened the epoxide ring with the addition of the elements of hydrogen fluoride, and then we hydrolyzed the ketal group, for example by treatment with p-toluenesulfonic acid in acetone solution at room temperature. Thus we produced a 16,17-diester of 6β-fluoro-pregnan-5α,16α,17α-triol-3,20-dione (III; R=H) or a 16,17,21-triester of 6β-fluoro-pregnan-5α,16α,17α,21-tetrol-3,20-dione (III; R=acyloxy), respectively. Dehydration by means of a reaction with a strong enough acid caused the regeneration of the Δ⁴-double bond. The dehydration may be accompanied by the inversion of the steric configuration at C-6. For example, a short treatment with concentrated aqueous hydrochloric acid in acetic acid solution produced the corresponding diester of 6β-fluoro-Δ⁴-pregnene-16α,17α-diol-3,20-dione (IV; X=F; R=H) or the corresponding triester of 6β-fluoro-Δ⁴-pregnene-16α,17α,21-triol-3,20-dione (IV; X=βF; R=acyloxy). The treatment with dry hydrogen chloride in glacial acetic acid solution caused also the simultaneous inversion of the steric configuration at C-6 and thus we obtained the 6α-fluoro-analogues of such compounds (X=αF).

For the introduction of a chlorine atom at C-6 of the diester of 16α,17α-dihydroxy-progesterone or of the triester of the 16α-hydroxy-analogue of Compound S, we converted such compounds into their 3-alkyl-enol-ethers, preferably into their 3-ethyl-enol-ethers (V; R=H or acyloxy) and these compounds we treated with hypochlorous acid, using any reagent capable of liberating such acid, such as an N-chloro amide or imide or the hypochorite of an alkali or alkali-earth metal. For example, we employed N-chlorosuccinimide in mixture with acetone, sodium acetate and acetic acid. Thus we obtained a diester of 6β-chloro-Δ⁴-pregnene-16α,17α-diol-3,20 - dione (IV; X=βCl; R=H) or a triester of 6β-chloro-Δ⁴-pregnene-16α,17α,21-triol-3,20-dione (IV; X=βCl, R=acyloxy). The aforementioned treatment with dry hydrogen chloride in glacial acetic acid afforded the 6α-isomers of such compounds.

The dehydrogenation between C-1 and C-2 can be carried out by known purely chemical methods or microbiological methods. Preferably we refluxed a compound of Formula IV with selenium dioxide, in the presence of pyridine and in mixture with t-butanol, under an atmosphere of nitrogen. Thus we obtained a diester of the 6α and 6β-isomers of the corresponding 6-halo-Δ¹,⁴-pregnadiene-16α,17α-diol-3,20-dione (VI; R=H) or a triester of the respective 6-halo-Δ¹,⁴-pregnadiene-16α,17α,21-triol-3,20-dione (VI; R=acyloxy).

The ester groups can be formed with radicals of carboxylic acids having up to 12 carbon atoms, saturated or unsaturated, of straight or branched chain, cyclic or mixed cyclic-aliphatic, substituted or not by methoxy, halogen or other groups, and include such esters as the acetates, propionates, butyrates, hemisuccinates, enanthates, caproates, benzoates, trimethylacetates, cyclopentylpropionates, phenylpropionates, acetoxypropionates and β-chloropropionates. The triester may be hydrolyzed by conventional means to yield free alcohol groups.

The novel 6α-fluoro-16α-hydroxy derivatives of Δ⁴-pregnene-17α,21-diol-3,20-dione, the 1-dehydro derivative and 21-acetate thereof can also be prepared by a process illustrated by the following equation:

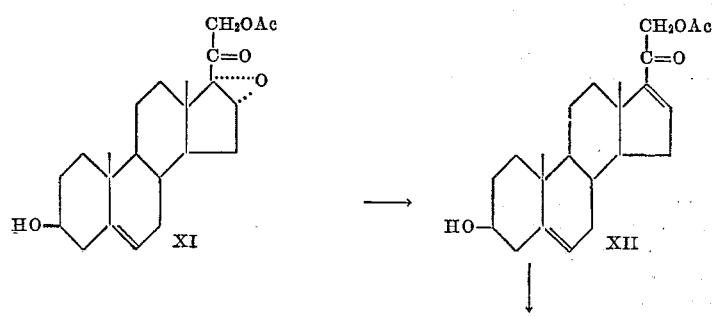

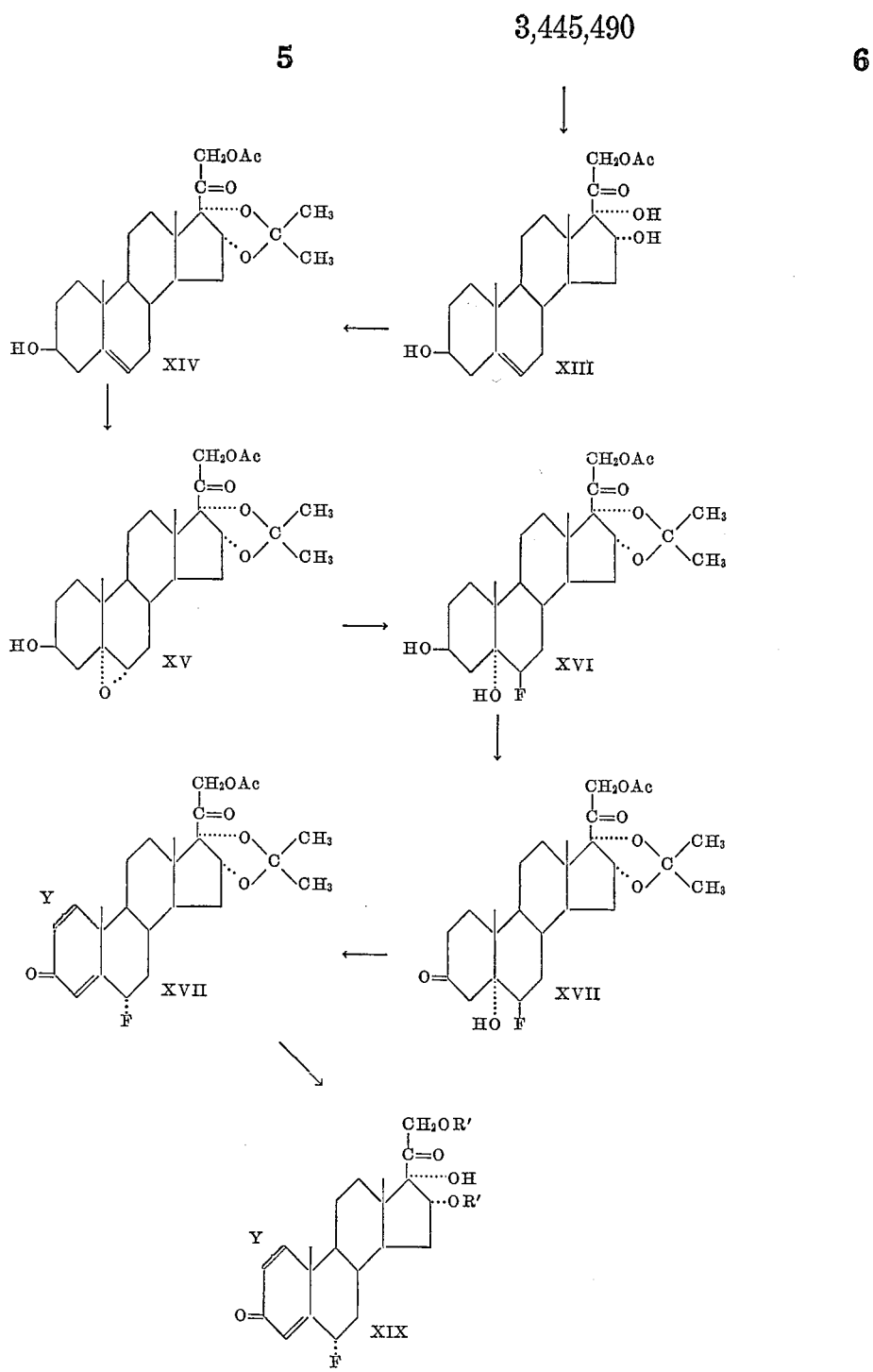

In the above formulae Y represents a double bond between C–1 and C–2 or a saturated linkage between C–1 and C–2. Ac represents the acyl group of a hydrocarbon carboxylic acid of up to 12 carbon atoms.

The known starting material 16α,17α-oxido-Δ⁵-pregnene-3β,21-diol-20-one-21-acetate described by Julian et al., J. Am. Chem. Soc., 72, 5145 (1950), is reacted with chromous chloride according to the method of Julian and Cole, J. Org. Chem., 19, 131 (1954) to form the known Δ⁵,¹⁶-pregnadiene-3β,21-diol-20-one-21-acetate. The latter is hydroxylated by the procedure described by Petrow et al., J. Am. Chem. Soc., 4373 (1955) with potassium permanganate to produce Δ⁵-pregnene-3β,16α,17α-21-tetrol-20-one 21-acetate which is transformed into the 16,17-cyclic ketal or acetal by reaction with a ketone such as acetone or an aldehyde in the presence of catalytic amounts of perchloric acid to protect the 16,17-dihydroxy group. For introduction of the 6-fluoro moiety, the aforementioned 16,17-acetonide is epoxidized by treatment with conventional reagents such as a peracid, for example, monoperphthalic acid, followed by chromatography of the crude product. The resulting 16α,17α-isopropylidenedioxy-21-acetoxy - 5α,6α - oxido-pregnan-3β-ol-20-one is treated with boron trifluoride etherate, preferably in mixture with benzene and ether, at room temperature to open the epoxide ring and introduce the elements of hydrogen and fluorine to form 6β-fluoro-16α, 17α-isopropylidene-dioxy - 21 - acetoxy - pregnane-3α,5α-diol-20-one which upon oxidation with an oxidizing agent such as chromic acid in dilute sulfuric acid yields the corresponding 3-keto compound. Upon treatment of the last mentioned compound with dry hydrogen chloride in acetone, dehydration accompanied by inversion of the steric configuration at C–6 is effected to produce 6α-fluoro-16α,17α-isopropylidenedioxy - 21 - acetoxy - Δ⁴ - pregnene-3,20-dione.

The dehydrogenation between C–1 and C–2 can be carried out as mentioned previously by known chemical methods or microbiological methods to form 6α-fluoro-16α,17α-isopropylidenedioxy - 21 - acetoxy-$\Delta^{1,4}$-pregnadiene-3,20-dione.

The 16α,17α-dihydroxy grouping is regenerated by hydrolysis of the 16α,17α-ketal by treatment of the latter with 60% formic acid under reflux conditions thus yielding 6α-fluoro-$\Delta^4$-pregnene-16α,17α,21-triol-3,20-dione-21-acetate or the 1-dehydro compound respectively. Further treatment with dilute alkaline solution, such as potassium hydroxide, results in saponification of the 21-acyl group to form the 6α-fluoro-$\Delta^4$-pregnene-16α,17α,21-triol-3,20-dione or the 1-dehydro form.

In another aspect of this invention, the 6α-fluoro-$\Delta^4$-pregnene-16α,17α,21-triol-3,20-dione-21-acetate obtained above can be treated with acetic anhydride in pyridine to produce the 16α,21-diacetate. Either the 21-monoacetate or the 16α,21-diacetate is dehydrogenated with selenium dioxide to yield the corresponding 6α-fluoro-$\Delta^{1,4}$-pregnadiene-16α,17α,21-triol-3,20-dione-21-acetate or the 16α,21-diacetate. Treatment of the latter with dilute methanolic alkaline solution results in the free 6α-fluoro-$\Delta^{1,4}$-pregnadiene-16α,17α,21-triol-3,20-dione which can further be reesterified by conventional means.

The blocking of the 16α,17α-dihydroxy-20-keto-grouping by ketal formation is necessary prior to the fluorination step to avoid formation of D-homo compounds. Thus in the general method of preparing 6α-fluoro-16α,17α-dihydroxy steroids, ketalization or acetalization of the 16α,17α-dihydroxy grouping is carried out prior to opening the 5α,6α-epoxide to introduce the elements of hydrogen fluoride. Thus, for example, the 16α,17α-isopropylidenedioxy-21-acetoxy-$\Delta^4$-pregnene-3,20-dione of Petrow et al. J. Chem. Soc., 4387 (1955), can be converted into the 3-cycloethyleneketal, followed by epoxidation of the double bond which shifted between C–5 and C–6, and then subsequent treatment with boron trifluoride yields 6β-fluoro-3-ethylenedioxy-16α,17α-isopropylidenedioxy-21-acetoxy-pregnane-5α-ol-20-one. Hydrolysis of the 3-ketal group, followed by dehydration at C–5 causes regeneration of the $\Delta^4$-3-keto group and inversion of the steric configuration at C–6; further hydrolysis of the 16α,17α-isopropylidenedioxy group affords the 6α - fluoro-$\Delta^4$ - pregnene-16α,17α,21-triol-3,20 - dione. Similar treatment of the 16α,17α-acetonide of the 21-acetate of 3-ethylenedioxy-$\Delta^5$-pregnene-16α-hydroxy cortisone and of the acetonide of 21-acetate of a 9α-halo-16α-hydroxy-hydrocortisone results in the 21-acetate of 6α-fluoro-16αhydroxy cortisone and 6α-fluoro-9α-halo-16α-hydroxy hydrocortisone.

The following preparations illustrate the production of starting compounds.

PREPARATION 1

A mixture of 5 g. of $\Delta^4$-pregnene-16α,17α-diol-3,20-dione, 500 cc. of anhydrous benzene, 50 cc. of acetic anhydride and 2 g. of p-toluenesulfonic acid was stirred at room temperature for 24 hours and diluted with water; the organic layer was separated, washed with water, 5% sodium carbonate solution and again with water to neutral, dried over anhydrous sodium sulfate and evaporated. Recrystallization of the residue from acetone-hexane afforded the diacetate of $\Delta^4$-pregnene-16α,17α-diol-3,20-dione.

PREPARATION 2

Similarly, $\Delta^4$-pregnene-16α,17α,21-triol-3,20-dione or the 21-monoacetate thereof was converted into its triacetate.

PREPARATION 3

When in the method of Preparation 1, the acetic anhydride was substituted by the anhydride of another carboxylic acid having up to 12 carbon atoms, there were obtained, from $\Delta^4$-pregnene-16α,17α-diol-3,20-dione the corresponding diesters, and from $\Delta^4$-pregnene-16α,17α,21-triol-3,20-dione or the 21-monoacetate thereof the respective triesters. For example, by reaction with propionic anhydride there were prepared the propionates, and reaction with caproc anhydride gave the caproates. When a long chain anhydride was used the reaction time was extended to 4 days.

PREPARATION 4

5 g. of $\Delta^4$-pregnene-16α,17α-diol-3,20-dione dissolved in 30 cc. of pyridine was treated with 5 cc. of propionic anhydride and kept overnight at room temperature; the mixture was poured into ice water, heated for half an hour on the steam bath, cooled and the precipitate was collected, washed with water, dried and recrystallized from acetone-hexane, thus giving $\Delta^4$-pregnene-16α,17α-diol-3,20-dione 16-propionate.

By subsequent treatment with cyclopentylpropionic acid anhydride, in accordance with the methods described in the previous preparations, there was obtained the 16-propionate-17-cyclopentylpropionate of $\Delta^4$-pregnene-16α,17α-diol-3,20-dione.

PREPARATION 5

By the method described in the previous preparation, there were esterified the secondary hydroxyl group and then the tertiary hydroxyl group at C–17, to produce a great variety of mixed diesters of $\Delta^4$-pregnene-16α,17α-dio,-3,20-dione and of $\Delta^4$-pregnene-16α,17α,21-triol-3,20-3,20-dione as well as the 16,21-diacetate of $\Delta^4$-pregnene-16α,17α,21-triol-3,20-dione have been described in the literature (Romo et al., J. Org. Chem., 21, 902 (1956); by subsequent reaction with enanthic anhydride, for example, we obtained the 16-acetate-17-enanthate of $\Delta^4$-pregnene-16α,17α-diol-3,20-dione and the 16,21-diacetate-17-enanthate of $\Delta^4$-pregnene-16α,17α,21-triol-3,20-dione, respectively.

The following specific examples serve to illustrate but are not intended to limit the present invention.

Example I

A mixture of 5 g. of $\Delta^4$-pregnene-16α,17α-diol-3,20-dione-diacetate, 300 cc. of anhydrous benzene, 35 cc. of ethyleneglycol and 250 mg. of p-toluenesulfonic acid was refluxed for 12 hours with the use of an adapter for the continuous removal of the water formed during the reaction; 50 cc. of 5% aqueous sodium carbonate solution and 500 cc. of water were added to the cooled mixture and the benzene layer was separated, washed with water, dried over anhydrous sodium sulfate and evaporated. The residue consisted of the crude 3-ethylenedioxy-$\Delta^5$-pregnene-16α,17α-diol-20-one diacetate, which was used for the next step without further purification. In another experiment this compound was purified by recrystallization from acetone-hexane.

A cooled solution of 5 g. of the above ketal in 100 cc. of chloroform was mixed with an ether solution of monoperphthalic acid containing 1.2 molar equivalents of the reagent; the mixture was kept at 0–5° C. for 16 hours in the dark and then diluted with water; the organic layer was separated, washed with water, dried over anhydrous sodium sulfate, evaporated to dryness and purified by chromatography. There was thus obtained 3-ethylenedioxy-5α,6α-oxido-pregnane-16α,17α-diol-20-one diacetate.

A solution of 3 g. of the above compound in a mixture of 150 cc. of ether and 150 cc. of benzene was treated with 3 cc. of boron trifluoride etherate and the mixture was kept at room temperature for 3 hours and then diluted with water; the organic layer, dried over anhydrous sodium sulfate was evaporated to dryness. The residue was purified by chromatography on neutral alumina to give 6β-fluoro-3-ethylenedioxy-pregnane-5α,16α,17α-triol-20-one-16,17-diacetate.

A solution of 2 g. of the above ketal in 150 cc. of acetone and 3 cc. of water was treated with 400 mg. of p-toluenesulfonic acid, and the mixture was kept standing at room temperature for 6 hours, diluted with water and the precipitate formed was collected by filtration, washed with water, dried and purified by recrystallization from acetone. There was obtained 6β-fluoro-pregnane-5α, 16α,17α-triol-3,20-dione-16,17-diacetate.

A solution of 2 g. of the above compound in 100 cc. of acetic acid was mixed with 2 cc. of aqueous concentrated hydrochloric acid and the mixture was kept for 1 hour at room temperature, diluted with water and the precipitate formed was collected, washed with water, dried and recrystallized from acetone-hexane, thus giving 6β - fluoro - $\Delta^4$ - pregnene - 16α,17α - diol - 3,20 - dione diacetate.

A mixture of 2 g. of the above compound, 100 cc. of anhydrous t-butanol, 0.8 g. of selenium dioxide and 0.5 cc. of pyridine was refluxed under nitrogen for 72 hours, cooled, filtered through celite washing the filter with a little hot t-butanol, and the filtrate and washings were combined and distilled to dryness under reduced pressure. The residue was dissolved in acetone, treated with decolorizing charcoal under reflux, cooled, dried over anhydrous sodium sulfate and evaporated to dryness. Chromatography of the residue on neutral alumina yielded 6β-fluoro - $\Delta^{1,4}$ - pregnadiene - 16α,17α - diol - 3,20 - dione diacetate.

Example II

By the method described in the previous example, $\Delta^4$-pregnene - 16α,17α,21 - triol - 3,20 - dione - 16,17,21 - triacetate was ketalized and then epoxidized to form 3-ethylenedioxy - 5α,6α - oxido - pregnen - 16α,17α,21 - triol-20-one triacetate; through the reactions with boron trifluoride and then with p-toluenesulfonic acid, the latter compound was converted into 6β-fluoro-pregnane-5α,16α,17α,21-tetrol-3,20-dione 16,17,21-triacetate. Upon subsequent dehydration by treatment with aqueous concentrated hydrochloric acid, there was obtained 6β-fluoro-$\Delta^4$-pregnene-16α,17α,21-triol-3,20-dione triacetate, which was dehydrogenated by refluxing with selenium dioxide. There was thus obtained 6β-fluoro-$\Delta^{1,4}$-pregnadiene-16α,17α,21-triol-3,20-dione triacetate.

Example III 1.5 g. of 6β-fluoro-pregnane-5α,16α,17α-triol-3,20-dione 16,17-diacetate, intermediate in the method of Example I, was dissolved in 75 cc. of glacial acetic acid and a slow stream of dry hydrogen chloride was introduced into the solution for 2 hours while the temperature of the mixture was maintained below 15° C. After pouring into ice water the precipitate was collected, washed with water, dried and recrystallized from acetone-hexane. There was thus obtained 6α - fluoro-$\Delta^4$-pregnene-16α,17α-diol-3,20-dione diacetate, which was in turn refluxed with selenium dioxide to form 6α-fluoro-$\Delta^{1,4}$-pregnadiene-16α,17α-diol-3,20-dione diacetate.

Example IV

By an analogous method to that described in the previous example, 6β - fluoro-pregnane-5α,16α,17α,21-tetrol-3,20 - dione - 16,17,21 - triacetate, an intermediate in the method of Example II, was converted into 6α-fluoro-$\Delta^4$-pregnene-16α,17α,21-triol-3,20-dione triacetate, which was dehydrogenated to 6α-fluoro-$\Delta^{1,4}$-pregnadiene-16α,17α,21-triol-3,20-dione triacetate.

Example V

In accordance with the methods of Examples III and IV, there were treated with dry hydrogen chloride 6β-fluoro - 3 - ethylenedioxy - pregnane - 5α,16α,17α - triol-20-one 16,17-diacetate and 6β - fluoro - 3 - ethylenedioxy-pregnane - 5α,16α,17α,21 - tetrol-3,20-dione triacetate, respectively. Since this reaction involves the hydrolysis of the ketal group, there were thus directly obtained the respective $\Delta^4$-3-ketones.

Example VI

A solution was prepared of 5 g. of $\Delta^4$-pregnene-16α,17α-diol-3,20-dione diacetate in 35 cc. of anhydrous dioxane and then 5 cc. of ethyl orthoformate and 150 mg. of p-toluenesulfonic acid were added. The mixture was stirred for 30 minutes and then 12 cc. of pyridine and 500 cc. of water were slowly added under stirring and cooling. The mixture was kept at low temperature until the precipitate became crystalline, which was collected by filtration, washed with water, dried and recrystallized from methanol. There was thus obtained 3-ethoxy-$\Delta^{3,5}$-pregnadiene-16α,17α-diol-20-one diacetate.

A mixture of 4 g. of the above enol-ether, 2.1 g. of anhydrous sodium acetate and 120 cc. of acetone was cooled to 0° C. and mixed with 3.7 g. of N-chlorosuccinimide and 2 cc. of glacial acetic acid. The mixture was stirred for 3 hours at 0–5° C., ice water was added and the mixture was kept overnight at a temperature around 0° C. The precipitate was collected, washed with water, dried and recrystallized from acetone-hexane. There was thus obtained 6β - chloro - $\Delta^4$-pregnene-16α,17α-diol-3,20-dione diacetate.

By the method described in Example III, the above compound was dehydrogenated by refluxing with selenium dioxide, thus giving 6β-chloro-$\Delta^{1,4}$-pregnadiene-16α,17α-diol-3,20-dione diacetate.

Example VII

The method of the previous example was applied to $\Delta^4$-pregnene-16α,17α,21-triol-3,20-dione triacetate; via the enol-ethyl-ether there was obtained 6β-chloro-$\Delta^4$-pregnene-16α,17α,21-triol-3,20-dione triacetate and then 6β-chloro-$\Delta^{1,4}$-pregnadiene-16α,17α,21-triol-3,20-dione triacetate.

Example VIII

By treatment with dry hydrogen chloride, as has been described for this reaction in Example III, there was inverted the steric configuration at C–6 of the 6β-chloro compounds mentioned in Examples VI and VII.

Example IX

The methods described in the previous examples were applied to the diesters of $\Delta^4$-pregnene-16α,17α-diol-3,20-dione and to the triesters of $\Delta^4$-pregnene-16α,17α,21-triol-3,20-dione, described in Preparations 1 to 5 inclusive, to obtain the corresponding esterified intermediate compounds and final products.

Example X

A solution of 78 g. of 16α,17α-oxido-$\Delta^5$-pregnene-3β,21-diol-20-one 21-acetate in 2 lt. of glacial acetic acid was treated with 400 cc. of an aqueous solution of chromous chloride prepared by zinc-amalgam reduction of 133 g. of $CrCl_3 \cdot 6H_2O$. The mixture was kept for 5 minutes at room temperature and the reaction product was precipitated by dilution with water, collected by filtration, washed and redissolved in 1.5 lt. of acetone. 10 cc. of concentrated hydrochloric acid was added and the mixture was refluxed for 1 hour and concentrated until crystallization started. The mixture was cooled and the precipitate of the crystalline $\Delta^{5,16}$ - pregnadiene - 3β,21-diol-20-one 21-acetate was collected, washed with water, dried and recrystallized from acetone; M.P. 177–179° C.; $[\alpha]_D$ —41° (chloroform); $\lambda_{max}$. 242 mμ, log E 3.93.

A solution of 40 g. of the above compound in 1.2 lt. of acetone containing 8 cc. of acetic acid was cooled to 0° C. and treated with a solution of 18 g. of potassium permanganate in a mixture of 150 cc. of water and 850 cc. of acetone; the mixture was stirred at 0° C. for 5 minutes and filtered through celite; the filtrate was concentrated under reduced pressure, precipitated by dilution with water and the product was collected by filtration. By recrystallization from aqueous acetone there was obtained $\Delta^5$-pregnene-3β,16α,17α,21-tetrol-20-one 21-acetate.

A solution of 13.5 g. of the above compound in 350 cc. of acetone was treated with 3.5 cc. of 72% perchloric acid and stirred for 1 hour at room temperature. There was then added 5% aqueous sodium bicarbonate solution until complete precipitation of the reaction product which was collected, washed with water, dried and recrystallized from acetone, thus yielding 16α,17α - isopropylidenedioxy - 21-acetoxy - Δ⁵ - pregnene - 3β-ol-20-one, M.P. 215–216° C.; [α]$_D$+8° (chloroform).

A solution of 10 g. of the above acetonide in 100 cc. of chloroform was mixed with an ether solution of monoperphthalic acid containing 1.4 equivalents of reagent and the mixture was kept overnight at room temperature and in the dark. After diluting with water the organic layer was separated, washed with 5% aqueous sodium bicarbonate solution and water, dried over anhydrous sodium sulfate, filtered and evaporated to dryness. Crystallization of the residue from acetone-hexane afforded 16α,17α-isopropylidenedioxy - 21 - acetoxy-5α,6α-oxido-pregnane-3β-ol-20-one; M.P. 195–196° C.; [α]$_D$±0° (chloroform).

A solution of 10 g. of the above compound in 1 lt. of a mixture of equal parts of benzene and ether was treated with 20 cc. of recently distilled boron trifluoride etherate; the mixture was kept overnight at room temperature and diluted with water; the organic layer was separated, washed with water, dried over anhydrous sodium sulfate and the solvent was evaporated under reduced pressure. The residue was purified by chromatography on neutral alumina followed by recrystallization from acetone-hexane, thus furnishing 6β - fluoro - 16α,17α-isopropylidenedioxy-pregnane-3β-5α,21-triol-20-one 21-acetate; M.P. 224–226° C.; [α]$_D$+29.5° (chloroform).

A solution of 2.9 g. of the above compound in 100 cc. of acetone was cooled to 0° C. and was treated under an atmosphere of nitrogen and under continuous stirring with an 8 N solution of chromic acid prepared in dilute sulfuric acid, while the temperature of the mixture was maintained around 0° C., until the brown-red color of chromium trioxide persisted in the mixture. The stirring was continued for 5 minutes more at 0° C. and the mixture was then poured into water and the precipitate formed was collected, washed with water, dried and recrystallized from acetone-hexane, thus producing 6β-fluoro-16α,17α-isopropylidenedioxy - pregnane-5α,21-diol-3,20-dione 21-acetate, M.P. 225–227° C.; [α]$_D$+48° (chloroform).

A slow stream of dry hydrogen chloride was introduced for 3 hours into a solution of 1.5 g. of the above compound in 150 cc. of acetone, maintaining the temperature around 0° C. The mixture was poured into ice cold 5% aqueous sodium bicarbonate solution and the product was extracted with ethyl acetate, washed with water, dried over anhydrous sodium sulfate and the solvent was evaporated; recrystallization of the residue from acetone yielded 6α-fluoro - 16α,17α-isopropylidenedioxy - Δ⁴-pregnene-21-ol-3,20-dione 21-acetate; M.P. 295–296° C.; [α]$_D$+106° (chloroform); max. 236 mμ, log E 4.19.

A mixture of 1 g. of the above compound and 100 cc. of 60% formic acid was refluxed for half an hour, cooled, diluted with 200 cc. of ice water and the precipitate was collected, washed with water, dried and recrystallized from aqueous acetone, thus furnishing 6α-fluoro-Δ⁴-pregnene-16α,17α,21-triol-3,20-dione 21-acetate; M.P. 206–208° C.; [α]$_D$+86° (chloroform).

A mixture of 450 mg. of the above compound and 5 cc. of a 1% methanolic solution of potassium hydroxide was stirred for 1 hour at 0°C. under an atmosphere of nitrogen; after acidifying with a few drops of acetic acid the solvent was removed under vacuum and the residue crystallized from acetone, thus yielding the free 6α-fluoro-Δ⁴-pregnene-16α,17α,21-triol-3,20-dione.

Example XI

A mixture of 5 g. of 6α-fluoro-16α,17α-isopropylidenedioxy-21-acetoxy-Δ⁴-pregnene-3,20-dione, 1 g. of selenium dioxide and 100 cc. of t-butanol was refluxed for 48 hours under an atmosphere of nitrogen, filtered through celite and the filtrate was evaporated to dryness under reduced pressure; the residue was decolorized by refluxing its acetone solution with charcoal and the product was purified by chromatography on neutral alumina. There was thus obtained 6α-fluoro-16α,17α-isopropylidenedioxy-21-acetoxy-Δ¹,⁴-pregnadiene-3,20-dione.

By refluxing the above compound with 60% formic acid, in accordance with the method of Example X, there was obtained 6α-fluoro-Δ¹,⁴-pregnadiene-16α,17α,21-triol-3,20-dione 21-acetate, and then the free alcohol was obtained by treatment with potassium hydroxide.

Example XII

In accordance with the method of the previous example, there was dehydrogenated 6α-fluoro-Δ⁴-pregnene-16α,17α,21-triol-3,20-dione 21-acetate, intermediate in Example X, to produce 6α-fluoro-Δ¹,⁴-pregnadiene-16α,17α,21-triol-3,20-dione 21-acetate.

Example XIII

A mixture of 1 g. of 6α-fluoro-Δ⁴-pregnene-16α,17α,21-triol-3,20-dione 21-acetate, intermediate in Example X, 1 cc. of acetic anhydride and 5 cc. of pyridine was kept overnight at room temperature and poured into water; the precipitate was collected, washed with water, dried and recrystallized from acetone-hexane, thus giving 6α-fluoro-Δ⁴-pregnene-16α,17α,21-triol-3,20-dione 16,21-diacetate. The latter was subjected to the reaction with selenium dioxide in accordance with the method described in Example XI, to produce 6α-fluoro-Δ¹,⁴-pregnadiene-16α,17α,21-triol-3,20-dione 16,21 - diacetate; upon subsequent treatment with dilute methanolic potassium hydroxide, in accordance with the method of Example X, there was then obtained the free 6α-fluoro-Δ¹,⁴-pregnadiene-16α,17α,21-triol-3,20-dione.

A solution of 500 mg. of the above compound in 5 cc. of pyridine was treated with 2 cc. of propionic anhydride and the mixture was kept overnight at room temperature; it was then poured into water, heated for half an hour on the steam bath, cooled and the precipitate was collected, washed with water, dried and recrystallized from acetone-hexane. There was thus obtained 6α-fluoro-Δ¹,⁴-pregnadiene-16α,17α,21-triol-3,20-dione 16,21 - dipropionate.

Example XIV

There were mixed 425 cc. of 1.74% dipotassium hydrogen phosphate solution with 75 cc. of 1.38% sodium dihydrogen phosphate (A); a mixture of 1 lt. of 4.5% sodium chloride solution, 40 cc. of 5.75% potassium chloride solution and 10 cc. of 19.1% magnesium sulfate solution was diluted to 5 lt. (B); there was dissolved 20.9 g. fumaric acid and 14.4 g. of sodium hydroxide in 1 lt. of water and diluted to 1.2 lt. (C); there were then mixed 475 cc. of A, 4.32 lt. of B and 1.2 lt. of C.

The adrenal glands of recently slaughtered bovine were defatted and ground in a meat grinder; 3 kg. of the resulting mass was added to 6 lt. of the above aqueous medium.

There was then added a solution of 3 g. of 6α-fluoro-Δ⁴-pregnene-16α,17α,21-triol-3,20-dione in the minimum amount of propyleneglycol and the mixture was stirred for 3 hours at 28–37° C.; 40 lt. of acetone was added and the mixture was stirred for 1 hour further at room temperature.

The solid was removed by filtration and washed with 2 portions of 10 lt. of acetone, the filtrate and washings were combined and concentrated to 5 lt. under reduced pressure and taking care that the temperature did not rise over 30° C.; the residue was washed with 3 portions of 4 lt. and the hexane was discarded. The reaction product was extracted with several portions of methylene chloride and the extract was washed with water, dried over anhydrous sodium sulfate and concentrated to 300 cc. under reduced pressure at room temperature. The concentrated solution was transferred to a column charged with a mixture of 90 g. of celite and 90 g. of silica gel and the column was washed with a mixture of 3 lt. of methylene chloride and 100 cc. of acetone and then with a mixture of 1600 cc. of methylene chloride and 400 cc.

of acetone which eluted the 6α-fluoro-16α-hydroxyhydrocortisone; it was then purified by crystallization from acetone-hexane.

Example XV

A culture of *Cunninghamella bainieri* ATCC 9244 was prepared by inoculating an aqueous medium containing 2% of peptone and 5% of corn syrup with a vegetating growing culture of such fungus prepared in the same medium and then incubating at 28° C. for 24 hours.

To each lt. of this culture there was added 30 cc. of a 1% solution of 6α-fluoro-Δ$^{1,4}$-pregnadiene-16α,17α,21-triol-3,20-dione in methanol and the mixture was stirred under aeration at 28° C. for 24 hours. A total of 3 g. of the steroid was incubated in this manner. The product was extracted with several portions of methylene chloride and the extract was washed with water, dried over anhydrous sodium sulfate and concentrated to a small volume under reduced pressure.

The total combined extracts were absorbed on a column prepared with a mixture of 60 g. of celite and 60 g. of silica gel previously washed with methylene chloride. The product was then eluted from the column with a mixture of methylene chloride and acetone 80:20, the solvent was evaporated and the residue crystallized from acetone-methylene cholride. There was thus obtained 6α-fluoro-16α-hydroxy-prednisolone.

Example XVI

By essentially following the procedure described in the previous example, but substituting the culture of Cunninghamella by a culture of *Rhizopus nigricans* ATCC 6227b, there was obtained 6α-fluoro-16α-hydroxy-11-epi-prednisolone.

Example XVII

A mixture of 1 g. of 6α-fluoro-16α,17α-isopropylidenedioxy-Δ$^4$-pregnen-21-ol-3,20-dione 21-acetate, intermediate in Example X, and 10 cc. of 1% methanolic potassium hydroxide was stirred for 1 hour at 0° C. and under an atmosphere of nitrogen. The mixture was diluted with water and the precipitate was collected by filtration, washed with water, dried and recrystallized from acetone-hexane, thus affording the free 6α-fluoro-16α,17α-isopropylidenedioxy-Δ$^4$-pregnen-21-ol-3,20-dione.

500 mg. of the above compound was incubated with a culture of the fungus *Cunninghamella bainieri* ATCC 9244, essentially following the method of incubation described in Example XV, thus producing the acetonide of 6α-fluoro-16α-hydroxy-hydrocortisone.

We claim:
1. A compound of the formula

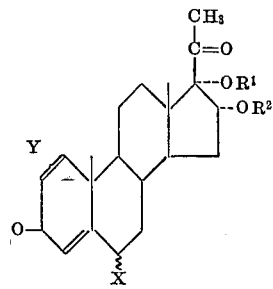

wherein Y is selected from the group consisting of a double bond between C-1 and C-2 and a saturated linkage between C-1 and C-2; R$^1$ and R$^2$ are each an acyl group of a hydrocarbon carboxylic acid of up to 12 carbons; and X is selected from the group consisting of chlorine and fluorine.

2. The 16,17-diesters of hydrocarbon carboxylic acid of up to 12 carbon atoms of 6α-fluoro-Δ$^4$-pregnene-16α,17α-diol-3,20-dione.

3. The 16,17-diesters of hydrocarbon carboxylic acids of up to 12 carbon atoms of 6β-fluoro-Δ$^4$-pregnene-16α 17α-diol-3,20-dione.

4. The 16,17-diesters of hydrocarbon carboxylic acids of up to 12 carbon atoms of 6α-chloro-Δ$^4$-pregnene-16α, 17α-diol-3,20-dione.

5. The 16,17-diesters of hydrocarbon carboxylic acids of up to 12 carbon atoms of 6β-chloro-Δ$^4$-pregnene-16α, 17α-diol-3,20-dione.

6. The 16,17-diesters of hydrocarbon carboxylic acids of up to 12 carbon atoms of 6α-fluoro-Δ$^{1,4}$-pregnadiene-16α,17α-diol-3,20-dione.

7. The 16,17-diesters of hydrocarbon carboxylic acids of up to 12 carbon atoms of 6β-fluoro-Δ$^{1,4}$-pregnadiene-16α, 17α-diol-3,20-dione.

8. The 16,17-diesters of hydrocarbon carboxylic acids of up to 12 carbon atoms of 6α-chloro-Δ$^{1,4}$-pregnadiene-16α,17α-diol-3,20-dione.

9. The 16,17-diesters of hydrocarbon carboxylic acids of up to 12 carbon atoms of 6β-chloro-Δ$^{1,4}$-pregnadiene-16α,17α-diol-3,20-dione.

References Cited

UNITED STATES PATENTS 2,837,464   6/1958   Nobile _____ 195—51

OTHER REFERENCES

Mills et al.: "J.A.C.S.," vol. 81 (1959), pp. 1264-5 relied on.

ELBERT L. ROBERTS, *Primary Examiner.*

U.S. Cl. X.R.

195—51; 260—239.55, 999

UNITED STATES PATENT OFFICE
CERTIFICATE OF CORRECTION

Patent No. 3,445,490

May 20, 1969

Howard J. Ringold et al.

It is certified that error appears in the above identified patent and that said Letters Patent are hereby corrected as shown below:

Column 3, lines 1 to 15, formula III should appear as shown below:

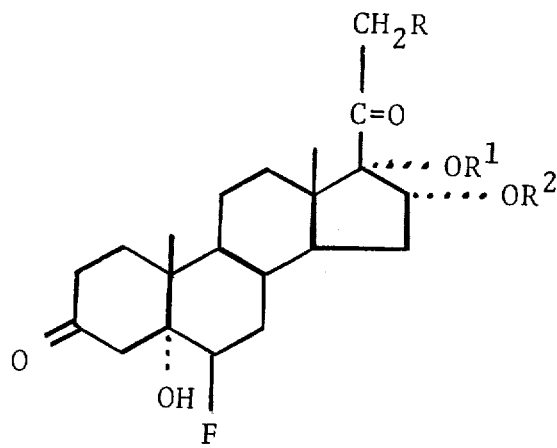

Column 6, line 65, "3α" should read -- 3β --. Column 7, line 47, "16αhydroxy" should read -- 16α-hydroxy --. Column 8, line 3, "caproc" should read -- caproic --; line 26, "dio," should read -- diol --; line 27, cancel "3,20-"; same line 27, after "dione" insert -- . The 16-monoacetate of Δ⁴-pregnene 16α,17α-diol-3,20-dione --. Column 9, line 3, after "was" insert -- thus --. Column 14, lines 2 to 14, the formula should appear as shown below:

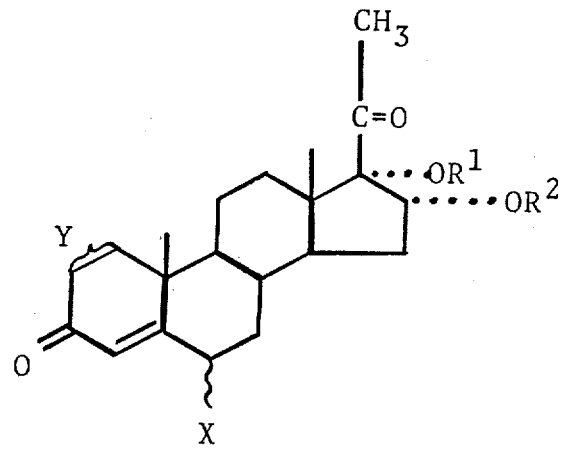

Signed and sealed this 16th day of June 1970.

(SEAL)
Attest:

EDWARD M. FLETCHER, JR.
Attesting Officer

WILLIAM E. SCHUYLER, JR.
Commissioner of Patents